United States Patent Office 2,986,837
Patented June 6, 1961

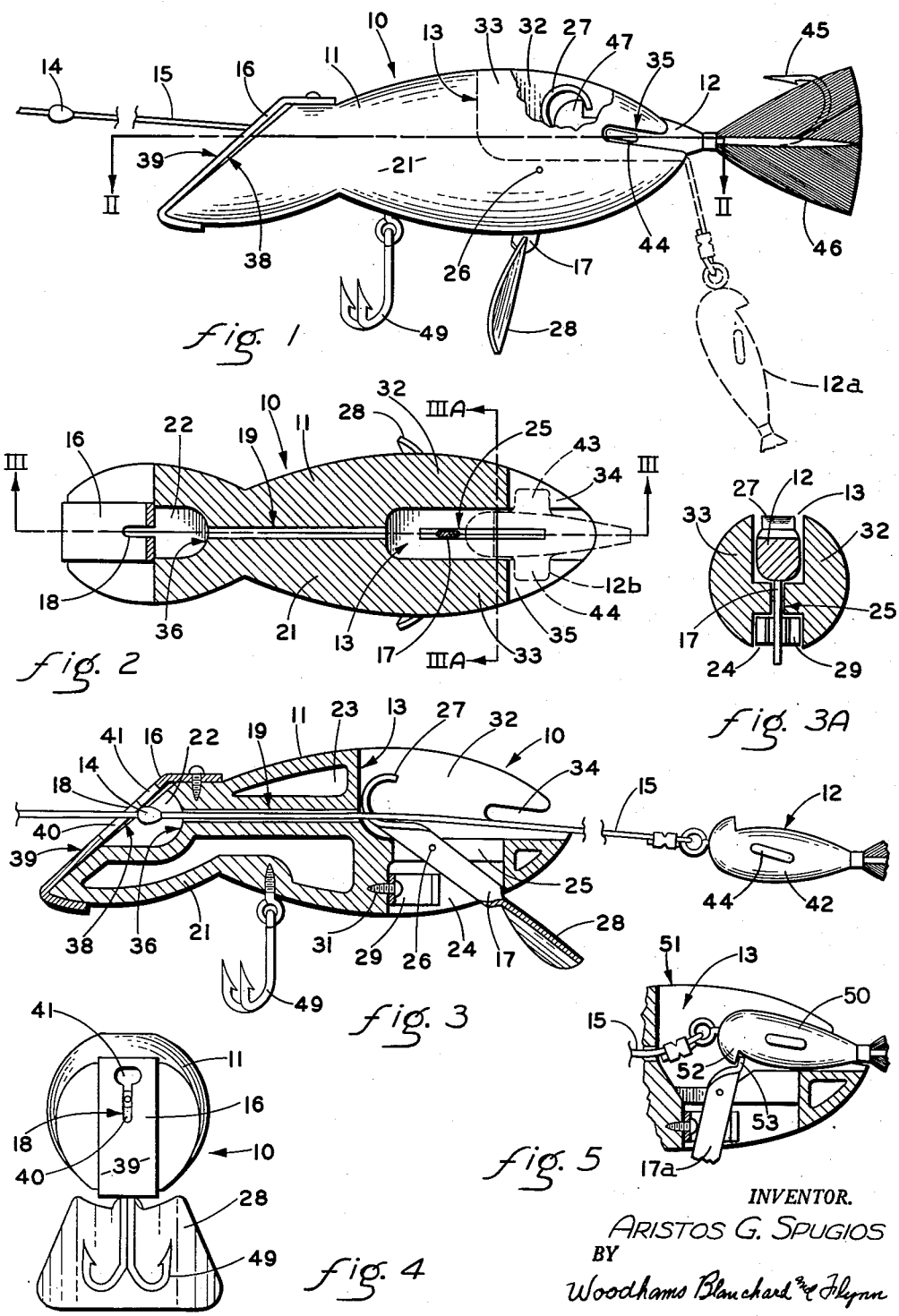

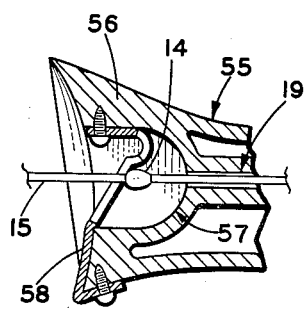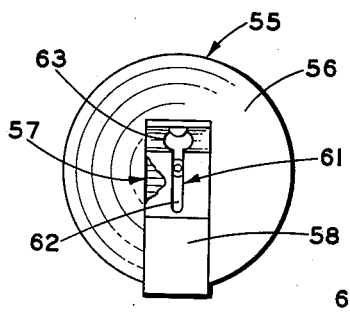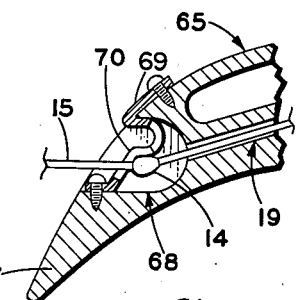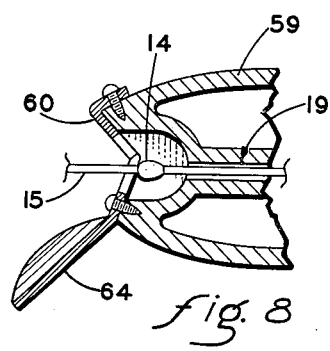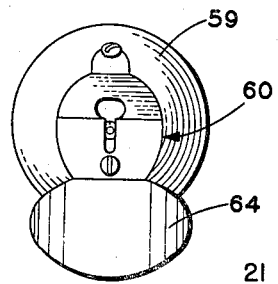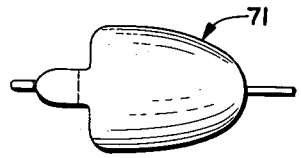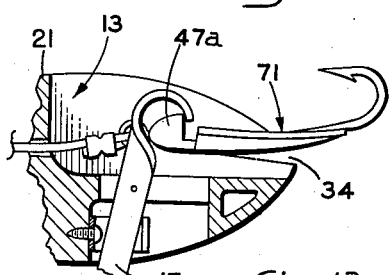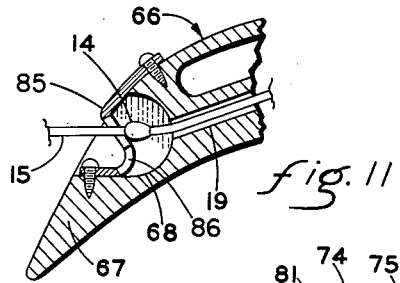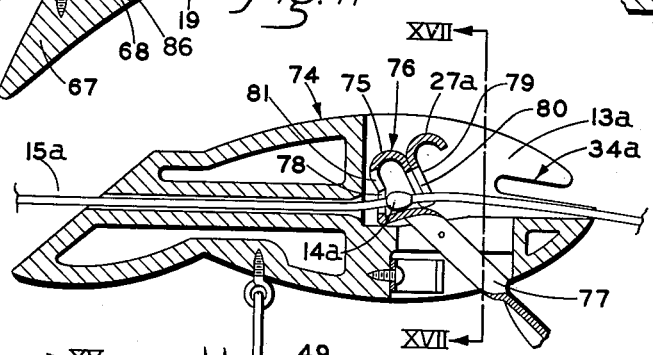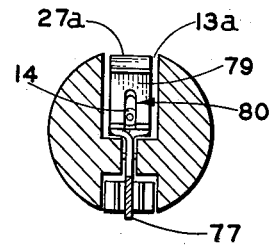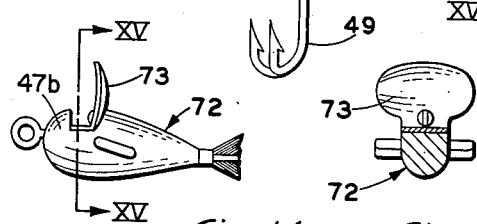

2,986,837
DOUBLE LURE FISH BAIT
Aristos G. Spugios, 535 Jasper St., Kalamazoo, Mich.
Filed Aug. 1, 1956, Ser. No. 601,567
1 Claim. (Cl. 43—42.15)

This invention relates in general to an artificial bait for fishing by casting or trolling and, more particularly, to a type thereof having a primary lure and a secondary lure, and having in cooperation therewith improved means for controlling and varying the distance between, and the relative positions of, the said lures, both before and after the fish bait is placed in the water.

As stated in detail in my co-pending application, Serial No. 444,596, filed July 20, 1954, and now Patent No. 2,794,288, many fish, particularly of the game type, will often follow a short distance behind an artificial, plug-type bait without striking at it. However, where there appears to be another fish following the plug bait, the game fish may often strike at this second fish. Thus, if it can be made to appear that there is a small fish following the plug, many game fish will often be caught which might not otherwise be induced to strike at all.

Having recognized the advantages of a dual lure, artificial-type bait, it has become apparent that a more efficient mechanism is necessary to control the relative positions of, and the distance between, the primary and secondary lures of a dual-type fish bait.

Game-type fish fish are very wary and any malfunction or mix-up in the operation of the bait being used will quickly frighten such fish away. Thus, any mechanism which is used in separably securing the secondary lure with respect to the primary lure, or causing the secondary lure to take a preselected position with respect to the primary lure, particularly after the bait strikes the water, must appear to be sufficiently natural and must, to be of any effective value, be sufficiently foolproof that it will not frighten the game fish away. Also, the mechanism by which the two lures can be caused to take said preselected position with respect to each other must require very little effort on the part of the person utilizing the fish bait, must be substantially automatic, and must operate with certainty each time the fish bait is used.

Accordingly, a primary object of this invention is the provision of a dual lure, artificial fish bait with an improved type of mechanism for controlling and varying the distance between the primary and secondary lures of said dual bait.

A further object of this invention is the provision of a lure-positioning mechanism, as aforesaid, which will operate positively, accurately and without failure in each and every instance of reasonably normal use, and which will not become fouled or alarm game fish which might be in the vicinity of the fish bait when it is used.

A further object of this invention is the provision of a spacing or positioning mechanism for a two-part fish bait, as aforesaid, which is easy to operate, simple to fabricate, and which can be adapted to use with a variety of different styles and shapes of dual lure fish baits, including types which operate at the surface, just below the surface, or well below the surface of the water.

Other objects and purposes of this invention will become apparent to persons familiar with this type of equipment upon reading the following specification and examining the accompanying drawings, in which:

FIGURE 1 is a broken, side elevation view of an artificial fish bait embodying the invention showing in solid lines one position of the secondary lure and showing in broken lines another position of the secondary lure.

FIGURE 2 is a sectional view taken along the line II—II of FIGURE 1 and showing the secondary lure in broken lines.

FIGURE 3 is a sectional view taken along the line III—III of FIGURE 2 and showing the secondary lure in solid lines in another position.

FIGURE 3a is a sectional view taken along the line IIIA—IIIA of FIGURE 2 and showing the secondary lure in solid lines.

FIGURE 4 is an end elevation view of said fish bait, as viewed from the leftward or front end thereof, as appearing in FIGURE 1.

FIGURE 5 is a central, cross-sectional view of a modification of the rear end of the bait shown in FIGURE 3 and also showing a modification of the secondary lure.

FIGURE 6 is a central, cross-sectional view of a modification of the front end of the bait shown in FIGURE 3.

FIGURE 7 is a front end view of the modification shown in FIGURE 6.

FIGURE 8 is a central, cross-sectional view of a second modification of the front end of the bait shown in FIGURE 3.

FIGURE 9 is a front end view of the modification shown in FIGURE 8.

FIGURE 10 is a central, cross-sectional view of a third modification for the front end of the bait shown in FIGURE 3.

FIGURE 11 is a central, cross-sectional view of a fourth modification of the front end of the bait shown in FIGURE 3.

FIGURE 12 is a bottom view of another modified form of the secondary lure.

FIGURE 13 is a central, cross-sectional view of the rear end of the bait shown in FIGURE 3, and showing the modified secondary lure shown in FIGURE 12.

FIGURE 14 is a side elevation view of another modified form of the secondary lure.

FIGURE 15 is a sectional view taken along the line XV—XV of FIGURE 14.

FIGURE 16 is a central, cross-sectional view of a modified fish bait.

FIGURE 17 is a sectional view taken along the line XVII—XVII of Figure 16.

For purposes of convenience in description, the terms "upper," "lower," and derivatives thereof, will be used with reference to the fish bait as appearing in FIGURE 1. The terms "front," "rear," and derivatives thereof, will have reference to the left and right ends, respectively, of the fish bait as shown in FIGURE 1. The terms "inner," "outer," and derivatives thereof, will have reference to the geometric center of said bait.

General description

The fish bait 10 (FIGURES 1, 2 and 3), which is disclosed herein as one means of carrying out the objects and purposes of the invention, is comprised of a primary lure 11 and a secondary lure 12. The primary lure 11 contains a cavity or recess 13 in its rear end, into which at least a portion of the secondary lure 12 is removably receivable. Control mechanism, including a bead 14 on the line 15, a stop device 16 located near the front end of the primary lure 11, and a latch arm 17 pivotally disposed within the cavity 13, is provided in one particular embodiment for controlling the relative distance between the primary lure 11 and the secondary lure 12. Said line 15 passes through a slot 18 in the stop device 16 and a passageway 19 in the primary lure 11, which passageway communicates with the cavity 13.

Detailed construction

As shown in FIGURES 1, 2 and 3, the primary lure 11, in a preferred form, may have an elongated body 21 containing an upwardly and rearwardly opening cavity or recess 13 and a chamber 22 near the front end thereof, which are interconnected by means of the passageway 19, which is preferably substantially straight and of relatively small cross-section. Said body 21 may be provided with one or more water-tight compartments 23, if desired, to increase the buoyancy of said primary lure 11. Said body 21 also has a downwardly and rearwardly opening recess 24, which communicates with the cavity 13 through a slot 25 therebetween. The latch arm 17 extends through the slot 25 (FIGURES 3 and 3a) between the upper and lower recesses 13 and 24, respectively, and is pivotally supported at a point located between its upper and lower ends upon a substantially horizontal shaft 26 supported upon the body 21 within the slot 25 near the cavity 13. The upper end of said arm 17 is provided with a rearwardly and downwardly curving hook 27, and the lower portion of said arm 17 is provided with a broad, flat vane 28 disposed exteriorly of said body 21 and transversely of the lengthwise axis of said body. Thus, movement of the body 21 through the water will cause the vane 28 to move rearwardly, thereby causing the hook 27 to move upwardly and forwardly, for reasons appearing hereinafter.

A spring clip 29 is mounted upon the forward wall of the lower recess 24, as by means of a screw 31, for tightly, but releasably, engaging the latch arm 17 below the pivot shaft 26, and thereby temporarily holding the hook 27 in a rearward position. The side walls 32 and 33 of the cavity 13 are provided with rearwardly opening grooves 34 and 35, which are preferably spaced approximately the same distance from the slot 25, for reasons appearing hereinafter.

The chamber 22 has a rear wall 36 (FIGURE 3) through which the passageway 19 communicates, and a front wall (FIGURE 4), which, in this particular embodiment, is provided by the stop device 16. Here, said stop device 16 is a relatively rigid strip of material having a vertically elongated slot 18 therethrough, which communicates with the said chamber 22. The lower end 40 of said slot 18 is of relatively narrow width, whereas the upper end 41 of said slot 18 is of relatively wide width. More specifically, the upper end 41 is wide enough to permit the passage therethrough of the bead 14, whereas the lower end 40 is not. The front surface 39 of the device or strip 16 is preferably sloped with respect to the lengthwise extent of the primary lure 11, hence with respect to the passageway 19. Also, the upper end 41 of the slot 18 is substantially closer to the rear end of the lure 11 than is the lower end 40 of said slot.

The line 15, which extends through the slot 18, the chamber 22, the passageway 19, and the cavity 13, is secured to the front end of the secondary lure 12 in any convenient manner. Said secondary lure, in this particular embodiment, is substantially smaller and substantially denser than the primary lure 11, so that it will sink rather readily when released from engagement with the primary lure. Said secondary lure has an elongated body 42 with a pair of substantially parallel fins 43 and 44, which extend from the opposite sides of said body 42 and slope downwardly and rearwardly slightly with respect to the lengthwise axis of said body. A barbed hook 45 and camouflaging material 46, such as feathers, may be secured to, and extend rearwardly from, the body 42.

As shown in FIGURES 1, 2 and 3, at least the forward end of the secondary lure 12 is slidably receivable into the cavity 13, and the fins 43 and 44 are slidably receivable into the grooves 34 and 35, respectively. The body 42 has an upwardly extending boss 47, integral with the forward end thereof, which is engageable by the hook 27 on the upper end of the arm 17 when said hook is in its rearward position and said secondary lure is in the recess 13. The hook 27 prevents disengagement of the secondary lure 12 from the primary lure 11 while it is in this rearward position, and the spring clip 29 holds the hook in said rearward position.

The bead 14 on the line 15 is larger than the diameter of the passageway 19 adjacent to the chamber 22. Thus, when the bead 14 slides through the enlarged upper end 41 of the slot 18, it is trapped within the chamber 22.

Hence, the secondary lure 12 is movable from a position within the cavity 13, shown in FIGURE 1, to a position spaced from the primary lure 11, limited by engagement between the bead 14 and the rear wall 36 of the chamber 22 (FIGURE 3). The distance between these positions may be varied by adjusting the bead 14 along the line 15. Fish catching means, such as a hook 49, may also be secured to the body 21 of the primary lure 11.

*Operation*

In preparing the fish bait 10 for use as a casting plug, the secondary lure 12 is positioned with the front end of its body 42 disposed within the cavity or recess 13 at the rear end of the primary lure 11. The fins 43 and 44 will be disposed within the grooves 34 and 35, respectively, and the latch arm 17 will be rotated clockwise, as appearing in FIGURE 1, until the hook 27 extends over and around the boss 47, thereby preventing accidental disengagement of the secondary lure from the primary lure. When the hook 27 is in this position of engagement with the boss 47, the lower portion of said arm will be within the spring clip 29 and will be releasably but securely held thereby. The line 15 will extend through the passageway 19, the chamber 22, and the slot 18 in the stop device 16. Thus, the bead 14 on said line 15 (FIGURE 1), will be disposed outwardly and frontwardly of the primary lure body 21. The front end of the line 15 will be connected with a suitable casting rod, not shown, in a substantially conventional manner. The plug, or fish bait 10, is now ready for casting.

As the casting operation is commenced, the fish bait 10 will be suspended by the line 15, thereby causing the secondary lure 12 to be held snugly within the cavity 13 and against the primary lure 11 as indicated at 12b in FIGURE 2. When the cast is made, the inertia of the bait 10 moving through the air and pulling the line 15 after it will act to hold the line tight, thereby holding the secondary lure within said cavity 13. However, if the line 15 should overrun the fish bait 10 and become limp during the movement of the fish bait 10 through the air, the latch arm 17, through its engagement with the boss 47, will prevent disengagement of the secondary lure from the primary lure under almost all conditions of a normal casting operation. Thus, under the usual conditions of a casting operation, the fish bait 10 will strike the water with the primary and secondary lures held snugly together.

If the impact of the fish bait 10 with the water does not disengage the secondary lure from the primary lure, such disengagement is effected simply by pulling on the line 15 with a short, quick motion, in a manner which is not uncommon in normal bait casting operations. The forward movement of the bait, caused by such motion, will be opposed by the flat surface of the vane 28, which is crosswise of the intended direction of movement. The spring clip 29 is sufficiently yieldable that it will release the latch arm 17 as a result of this opposition and thereby permit the lower end of the latch arm 17 to move rearwardly. This rearward movement of the vane 28 will effect a corresponding forward movement of the hook 27, thereby disengaging said hook 27 from the boss 47 of the secondary lure 12. The secondary lure 12 is then free to drop off, and slide downwardly from, the rear end of the primary lure 11. It will be observed that, due to the greater density of the secondary lure 12, there will be a natural tendency for the rear end of the primary lure 11 to be slightly below the front end, thereby facilitating release of the secondary lure from the primary lure. As shown in broken lines at 12a in FIGURE 1, the secondary lure, once released from the primary lure 11, will slide downwardly, due to its density, thereby pulling the line 15 after it.

Release of the secondary lure from the primary lure will have two immediate effects. Due to the inertia of the heavier or denser secondary lure 12, the primary lure 11 will tend to move forwardly along the surface of the water as the secondary lure 12 moves downwardly away from the surface of the water. Secondly, the line 15 will move through the primary lure 11 until the bead 14 engages the front surface 39 of the stop device 16, which surface slopes rearwardly and upwardly. The bead 14 will normally engage the lower portion of the front surface 39 and be prevented from passing through the front wall because of the narrowness of the slot lower end 40. However, because the front surface is sloped with respect to the passageway 19, the bead 14 will tend to move up the slope until it can pass through the upper, enlarged portion 41 of said slot 18. The bead 14 then moves downwardly, due to the pull of the line 15 by the secondary lure 12, until it engages the rear wall 36 of the chamber 22 adjacent to the passageway 19. Since the passageway 19 is of less diameter than the bead 14, the line 15 is unable to move any further. Under normal conditions, this movement of the line 15, caused by the weight of the secondary lure 12, will occur in a matter of seconds, which will not normally exceed the time which a bait of this general type is commonly permitted to remain on the surface of the water at the end of the casting throw and before it is reeled in by the person controlling the bait.

When the line 15 is drawn through the water in a conventional manner, it will move with respect to the primary lure 11 until the bead 14 engages the rear surface 38 of the stop device 16 within the chamber 22. Due to the narrow portion 40 of the slot 18 being in a direct line with the normal movement of the bead 14 from the passageway 19, said bead will be prevented from moving outside of the chamber 22 by the stop device 16. In this embodiment, both the inner and outer surfaces of the stop device 16 slope upwardly and rearwardly. Thus, forward movement of the line 15 will tend to wedge the bead 14 between the lower end of the surface 38 and the converging, lower wall of the chamber 22. Accordingly, accidental disengagement of the bead 14 from the chamber 22, which can only be effected through the enlarged portion 41 at the upper end of the slot 18, becomes virtually impossible during the time that the fiish bait 10 is being drawn forwardly through the water. The greater buoyancy of the primary lure 11 will tend to raise the forward end of the body 21, thereby providing additional assurance against the possibility that the bead 14 will escape from the chamber 22 through the larger, upper portion 41 of said slot 18. If the forward movement of the bait 10 is stopped, as by releasing the tension on the line 15 ahead of the bead 14, the heavier, secondary lure will again urge the bead 14 back against the rear wall 36 of the chamber 22.

As the bait 10 is moved through the water, the vane 28 will impart a predeterminable motion to the primary lure 11, while the sloping fins 43 and 44 on the secondary bait 12 will tend to move said secondary bait upwardly into the wake of the primary lure 11. When the fiish bait 10 has been reeled in, it is reset very simply and very quickly by manually guiding the line 15 forwardly so that the bead 14 will pass up through the large portion 41 of the slot 18. The line 15 is then drawn through the primary lure 11 until the secondary lure 12 is moved into the position shown in solid lines in FIGURE 1, or in broken lines at 12b in FIGURE 2. The latch arm 17 is rotated clockwise, as appearing in FIGURE 1, until the hook 27 thereon again engages the boss 47 on said secondary lure 12. The fish bait 10 is now ready for another casting operation. It will be observed that no injury will result if the secondary lure should become disengaged from the hook 27 and discharged from the cavity 13 during the casting operation and before the bait strikes the water. Normally, the secondary bait will sink as soon as it strikes the water and thereby eliminate the need for effecting its disengagement from the primary lure.

The fish bait 10 may be used for trolling purposes, either by disengaging the secondary lure 12 from the primary lure 11 before placing same in the water, or by placing the fish bait 10 in the water and then effecting disengagement, as described above, which results in the spacing between the two lures.

*Modifications*

FIGURE 5 illustrates a modified fish bait 51, wherein the secondary lure 50 has a notch 52 on the lower side, into which the upper, straight end 53 of the latch arm 17a is receivable for holding the lure 50 in the recess 13.

FIGURES 6 and 7 disclose the leading end of an alternate bait 55 having a primary lure body 56 with a chamber, or cavity 57, adjacent to the front end thereof. The front wall of said chamber 57 is provided by the stop device 58. The device 58 is comprised of a relatively rigid strip having a vertical slot 61, which, in this particular embodiment, has its narrow portion 62 at the bottom and its enlarged portion 63 at the top thereof. However, regardless of the precise vertical location of said enlarged portion 63, it is preferably located in that part of the slot which is nearest to the rear end of the body 56. The narrow portion 62 of said slot, adjacent to said enlarged portion 63, is preferably sloped rearwardly of said body toward said enlarged portion. The operation of the alternate bait 55 will be substantially the same as the operation of the fish bait 10 described in detail hereinabove. The bead 14 will move upwardly along the slot 61 until it reaches the enlarged portion 63, through which it passes and becomes trapped within the chamber 57.

FIGURES 8 and 9 disclose a second alternate primary lure body 59 wherein the stop device 60 on the front end includes an integral spoon 64, which extends downwardly and slightly forwardly. A dual lure bait having the primary body 59 may operate the same as the bait 10, except that the spoon 64 will urge the body 59 to travel below the surface of the water, with a motion characteristic of baits having a spoon 64.

The alternate primary lure bodies 65 and 66 (FIGURES 10 and 11) are identical and each have spoon-type leading ends designed for effecting underwater movement of the primary lure bodies. The downwardly and forwardly sloped leading end 67 of said bodies 65 and 66 is provided with a chamber 68 which, in this particular case, opens through its upper surface near its forward end. In FIGURE 10, a stop device 69 comprised of a strip of rigid material having a lengthwise slot 70 therein partially covers the chamber 68. In FIGURE 11, the stop device 85 is also a strip of rigid material having a lengthwise slot 86 therein and it also partially covers the chamber 68. The stop devices 69 and 85 are of somewhat different shape as shown but they are arranged to operate in a similar manner to stop devices 16 and 58 described hereinabove.

FIGURES 12 and 13 illustrate a spoon-type secondary lure 71 and the manner in which it can be received into the grooves 33 and 34 in the rear end of the body 21 when the lure 71 is in the cavity 13. The secondary lure 71 has a latch boss 47a at its forward end.

FIGURES 14 and 15 disclose a modification of the secondary lure 12, shown in FIGURES 1 and 3, wherein a spoon 73 is mounted upon, and extends upwardly from, the upper surface of the secondary lure body 72 just behind the latch boss 47b. The wide part of the spoon 73 is so arranged with respect to the secondary lure body 72 that it is disposed above the primary lure body when the secondary lure body 72 is disposed therein.

FIGURES 16 and 17 disclose a modified primary lure body 74, wherein the rigid strip 75 of the stop device 76 is integral with the upper end of the latch arm 77 and located within the cavity 13a. The strip 75 has a slot 78 disposed lengthwise of the arm 77 for receiving the line 15a in a manner similar to that disclosed above with respect to the stop device 16. However, the device 76 includes a strip 79 which is spaced from the strip 75 below the hook 27a and through which a slot 80 is provided for slidably receiving the line 15a. Thus, the operation is somewhat different than the operation of the previously described embodiments in that the device 76 moves forwardly with the latch hook 27a to disengage the secondary lure and then moves rearwardly as the line 15a threads through the slot 78 as the secondary lure sinks. The bead 14a then slides up the strip 75 until it passes through the upper, enlarged portion 81 of the slot 78 and is trapped between the strip 75 and 79 thereby fixing the distance between the two lures.

Further, although several particular, preferred embodiments of my invention have been disclosed in detail hereinabove for illustrative purposes, it will be understood that other variations or modifications thereof, which lie within the scope of such disclosure, are fully contemplated unless specifically stated to the contrary in the appended claim.

I claim:

An artificial fish bait, which includes an elongated primary lure having a passageway therethrough and having a cavity at the rearward end of said passageway and a recess at the forward end of said passageway, said recess including a rearwardly extending lower wall, a secondary lure at least partially receivable in said cavity, releasable means for holding said secondary lure in said cavity, and a line extending through said passageway and secured to said secondary lure, said line having an enlargement thereon which is receivable in said reces, said line enlargement being of larger size than said passageway so that it can not pass therethrough; a plate fixedly and nonmovably secured to said primary lure and extending across said recess, at least a portion of said plate being sloped rearwardly and lying at an acute angle with respect to said lower wall of said recess; there being a vertical, elongated slot in said portion of said plate, said slot intersecting the longitudinal axis of said passageway and being enlarged in the rearward region of said sloped portion which is disposed vertically upward with respect to said longitudinal axis to permit passage of said line enlargement therethrough, the remainder of said slot being smaller than said line enlargement to prevent movement of said line enlargement therethrough, the construction and arrangement being such that when the primary lure moves relatively forwardly against the line enlargement the latter moves upwardly along the sloped portion of the plate to the slot enlargement and passes through the latter into the recess wherein it is thereafter maintained by its engagement with the rear side of said plate.

References Cited in the file of this patent

UNITED STATES PATENTS

| | | |
|---|---|---|
| 1,295,448 | Dingwell | Feb. 25, 1919 |
| 1,615,803 | Pflueger | Jan. 25, 1927 |
| 2,152,275 | Parkins | Mar. 28, 1939 |
| 2,435,011 | Mason | Jan. 27, 1948 |
| 2,609,633 | Cracker | Sept. 9, 1952 |
| 2,734,301 | Fuqua | Feb. 14, 1956 |
| 2,749,646 | Hall | June 12, 1956 |
| 2,794,288 | Marshall et al. | June 4, 1957 |